United States Patent [19]

Futer

[11] 4,078,498
[45] Mar. 14, 1978

[54] SINGLE POWER UNIT AIR PROPELLED SYSTEM

[76] Inventor: Rudolph E. Futer, 2027B Otis Dr., Alameda, Calif. 94501

[21] Appl. No.: 718,365

[22] Filed: Aug. 27, 1976

[51] Int. Cl.² ............................................. B61B 13/10
[52] U.S. Cl. .............................. 104/155; 104/138 R; 105/365; 243/2; 302/24; 302/31
[58] Field of Search ........................... 104/155, 138 R; 105/365; 243/1, 2, 3, 4, 6, 32; 302/2 R, 24, 25, 31, 29

[56] References Cited

U.S. PATENT DOCUMENTS

| 856,109 | 6/1907 | Stoetzel | 302/2 R |
|---|---|---|---|
| 3,352,512 | 11/1967 | James, Sr. | 243/2 |
| 3,731,647 | 5/1973 | Mimbiole, Jr. et al. | 302/24 |
| 3,797,405 | 3/1974 | Carstens et al. | 104/155 |
| 3,869,843 | 3/1975 | Darrah et al. | 302/25 X |
| 3,953,076 | 4/1976 | Hurd | 302/31 X |
| 3,980,024 | 9/1976 | Futer | 104/155 |

FOREIGN PATENT DOCUMENTS

| 1,906,829 | 11/1969 | Germany | 243/3 |
|---|---|---|---|
| 1,353,741 | 5/1974 | United Kingdom | 302/31 |

Primary Examiner—Trygve M. Blix
Assistant Examiner—Randolph A. Reese
Attorney, Agent, or Firm—James R. Cypher

[57] ABSTRACT

A low pressure air propelled transportation system for moving a vehicle or objects through a conduit having unrestricted, non-gated portals open at all times to atmospheric pressure at both ends. Adjacent the intake end of the conduit a plurality of Coanda-effect directional slit orifices are formed in the wall of the conduit. A manifold communicates with the orifices and blower means and supplies air through the orifices.

8 Claims, 12 Drawing Figures

U.S. Patent    March 14, 1978    Sheet 1 of 3    4,078,498
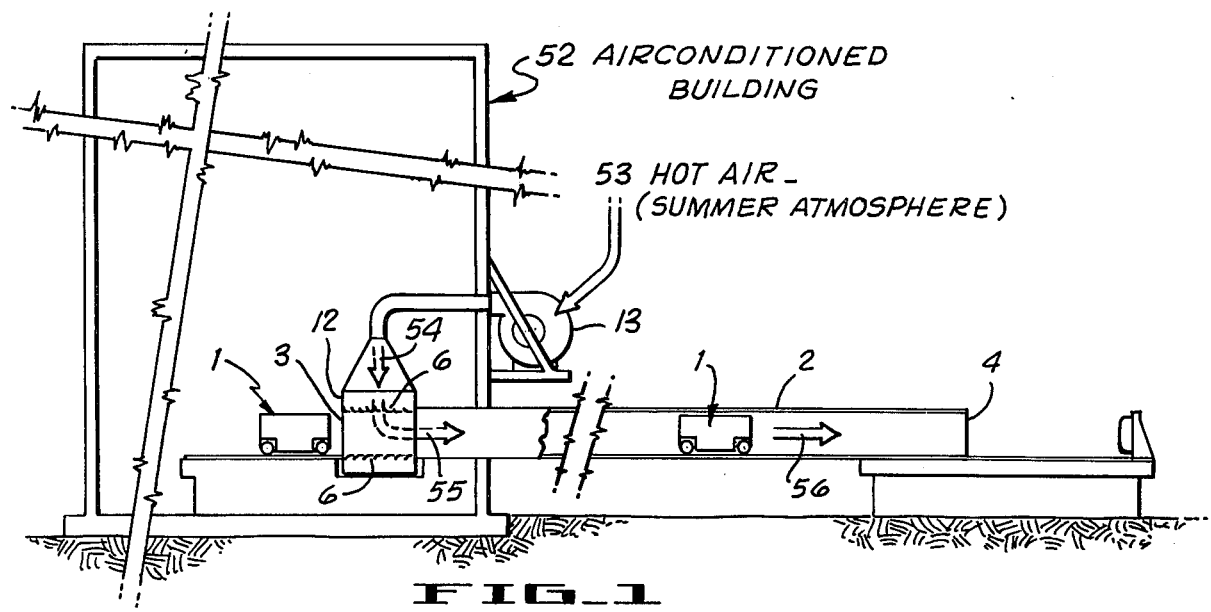
FIG_1
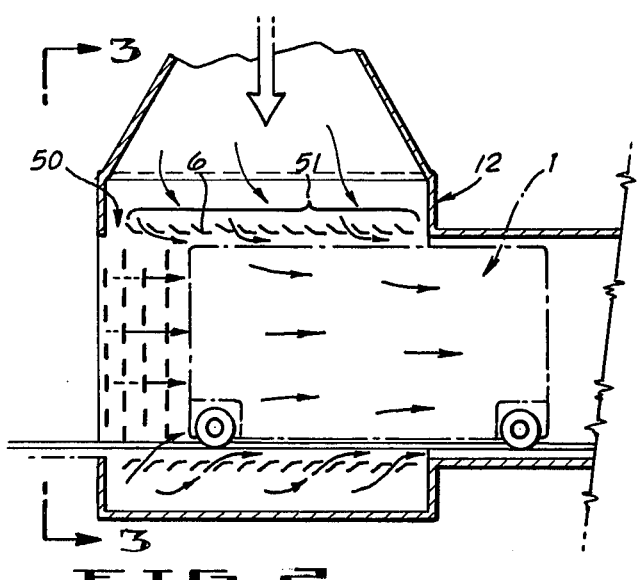
FIG_2
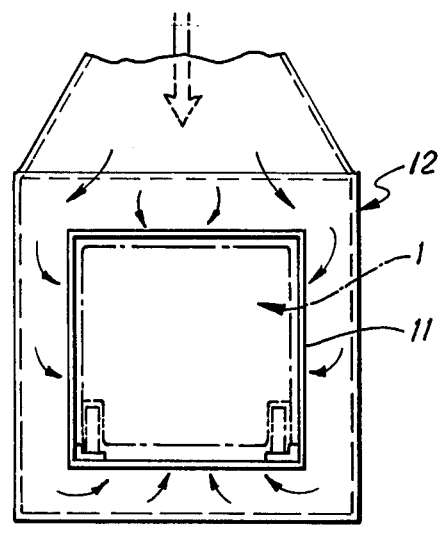
FIG_3

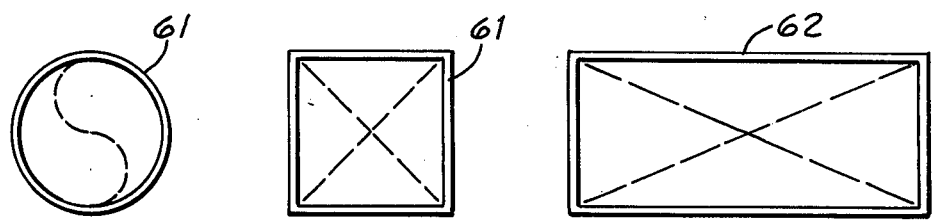
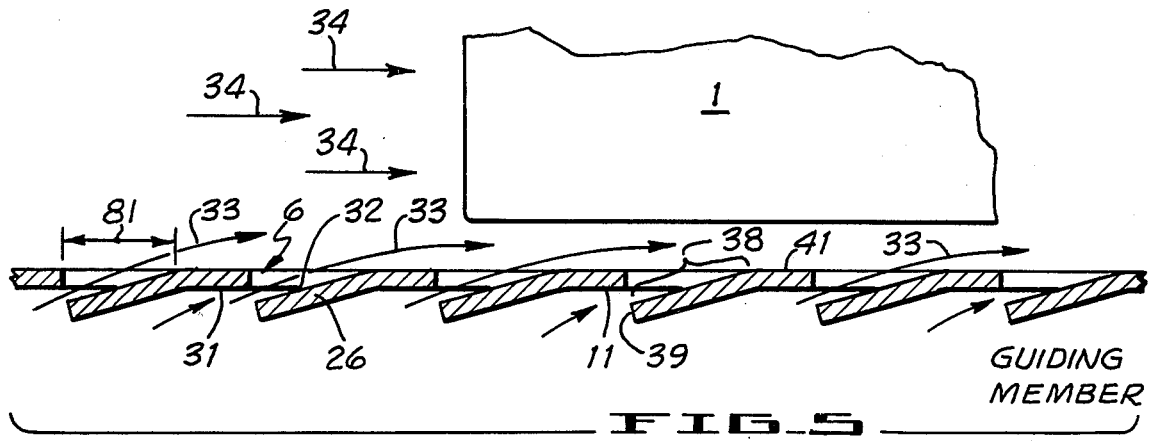
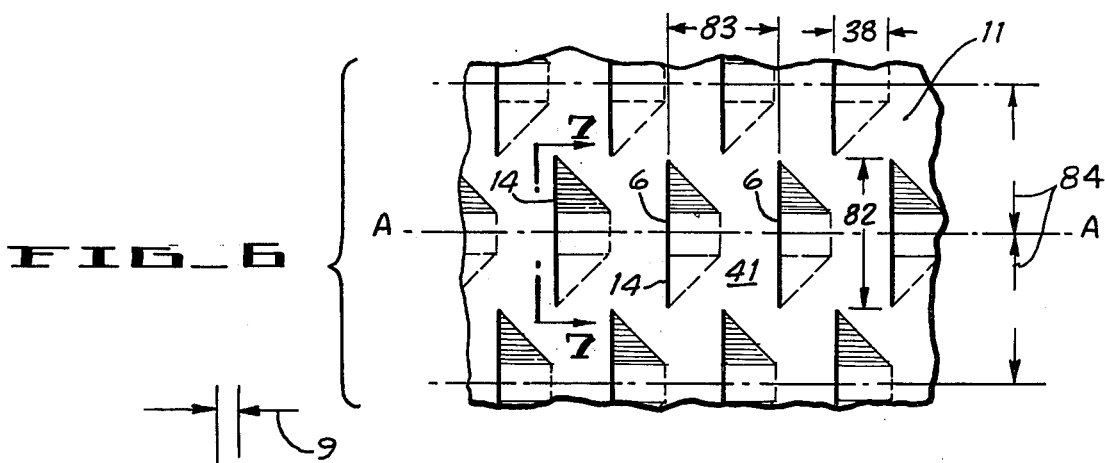
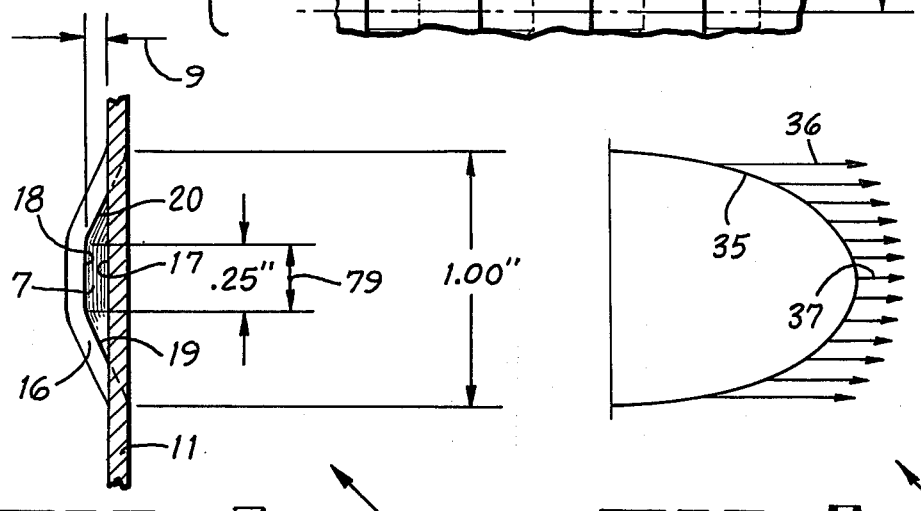

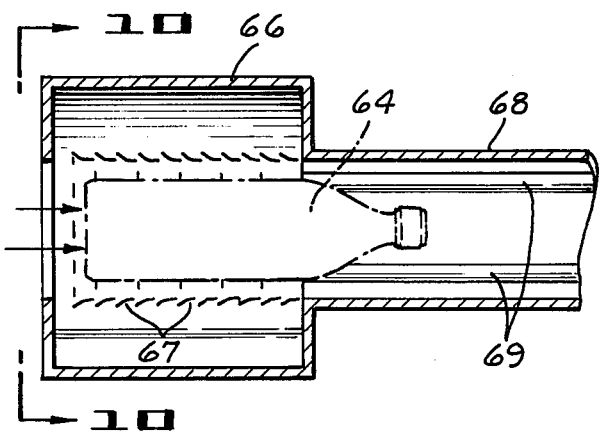
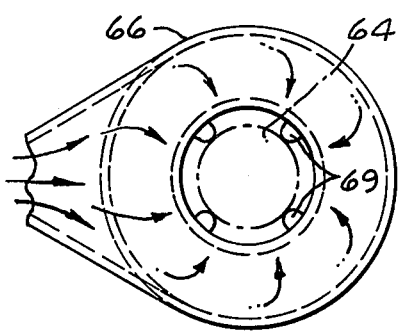
FIG_9   FIG_10
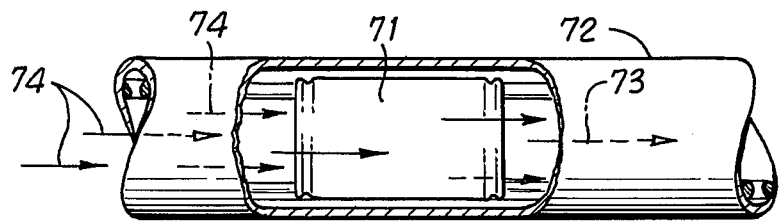
FIG_11
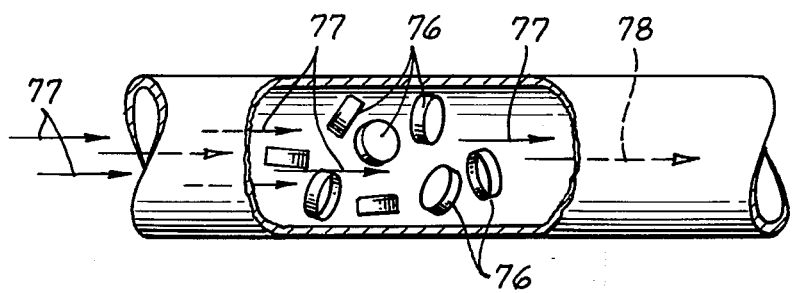
FIG_12

SINGLE POWER UNIT AIR PROPELLED SYSTEM

BACKGROUND OF THE INVENTION

In my application U.S. Pat. No. 524,747 filed Nov. 18, 1974, now U.S. Pat. No. 3,980,024 entitled Air Propelled Vehicle Transportation System there is disclosed a system in which the air used to drive a vehicle through a conduit is nearly totally injected into the conduit at one end through orifices in the conduit wall and nearly totally withdrawn through a second set of orifices formed in the conduit wall adjacent the other end. In my prior application, only a minimal amount of air enters or exits either portal even though both are open at all times and un-gated. The prior system is used where special conditions require that little or no air enter or leave the conduit at both portals.

There are many installations, however, where little or no air can be permitted to enter or exit at the entrance end only. The other end may not require such a special condition and air may exit freely through the other end. Such a situation exits where it is desired to transport objects out of an air conditioned or heated building. In order to prevent loss of the heated or cooled air of the building, it is desirable to move the objects using the air outside the building yet eliminate any movement of air in or out of the building through the conduit.

SUMMARY OF THE INVENTION

The gist of the present invention is the use of an area of Coanda-effect directional slit orifices adjacent the entrance end only of the conduit which substantially completely supplies the total system air adjacent one end. Further, there is nearly a complete absence of transfer of system air through the entrance conduit portal. The separation of the system air used for driving the vehicle or object from ambient air at one end makes the system particularly suitable for transportation systems which must move objects between the inside and outside of buildings. Such a system is particularly useful where there is a great difference in temperature between the inside and the outside of the buildings to prevent loss of heated or refrigerated air. Such a system may also be used to move objects from cold rooms to non-refrigerated areas of a factory.

An object of the present invention is to provide a transportation system without expensive air pumps and interlocks at a minimum of expense.

BRIEF DESCRIPTION OF THE DRAWINGS

FIG. 1 is a schematic side view of the system of the present invention with portions in cross section to illustrate movement of a vehicle from the inside to the outside of the building. A reversal of the fan will cause movement of the vehicle from the outside to the inside of the building.

FIG. 2 is a cross sectional view of the manifold used in the system of FIG. 1 on an enlarged scale.

FIG. 3 is an end view of the manifold of FIG. 3 taken along lines 3—3 of FIG. 2.

FIG. 4 shows three different illustrative cross-sectional shapes the conduit of FIG. 1 may have.

FIG. 5 is a cross section of the Coanda-effect directional slit orifices shown in a greatly enlarged scale.

FIG. 6 is a plan view of a portion of the conduit containing the directional orifices in a greatly enlarged scale.

FIG. 7 is a cross section of a single slit orifice taken along line 7—7 of FIG. 6.

FIG. 8 is a diagrammatic sketch of a theoretical air flow pattern at the entrance to the conduit in FIG. 1.

FIG. 9 is a cross section of the entry portal of another form of the invention of the present system in which the cargo conduit is circular and is adapted for moving objects of circular cross section such as a bottle.

FIG. 10 is a side view of the system shown in FIG. 9 taken along line 10—10.

FIG. 11 is a side view of a portion of the conduit shown in FIGS. 9 and 10 transporting a cylindrical can.

FIG. 12 is a side view of a portion of the conduit shown in FIGS. 9 and 10 with a portion removed to show the transport of a plurality of small objects such as plastic bottle caps.

DETAILED DESCRIPTION OF THE PREFERRED EMBODIMENTS OF THE INVENTION

The air propelled transportation system of the present invention for transporting objects by air currents briefly comprises: an elongated circuit 2 having a substantial length devoid of openings for containing moving air at low gauge pressure having unrestricted first and second non-gated portals 3 and 4 open at all times to atmospheric pressure at the ends of the conduit during operation of the system; a plurality of axially aligned closely spaced Coanda-effect directional slit orifices 6 each having an opening 7 which is substantially greater in width 8 than depth 9 formed in the walls 11 of the conduit and located adjacent the intake portal 3; the orifices have an area dimensioned to prevent passage of the objects therethrough; an air manifold 12 communicating with the plurality of directional orifices 6; powered fan or blower means 13 communicating with the air manifold for supplying or withdrawing a quantity of air from the manifold so that the pressure in the conduit is slightly above or below the pressure outside the portals; the conduit, Coanda-effect directional slit orifices, manifold, and power means are dimensioned and regulated to drive the objects through the conduit and to supply or withdraw substantially all of the air moving through the conduit through the manifold and with a minimal amount of air entering or leaving the entrance portal adjacent the manifold and orifices when no objects or traveling through the conduit and a minimal amount of air flows in or out of the portal adjacent the orifices when the objects are in transit through the conduit.

The Coanda-effect directional slit orifices are shown in detail in FIGS. 5, 6 and 7. Each orifice consists of a transverse slit 14 in the conduit in which a small portion 16 of the conduit is deformed outwardly at an acute angle to form an opening 7 in the wall so that air is directed into or out of the conduit at an angle with the axis of the conduit. As shown in FIG. 7, the shape of the opening is in the general form of a trapezoid having the longer parallel side of the orifice at the surface of the conduit, and the other parallel side 18 away from the surface of the conduit. The sloping sides 19 and 20 complete the orifice opening. It should be understood that the application is not limited to a trapezoidal shape directional orifice since the opening could be round or square; so long as it caused the throw of the air jet to be substantially in line with the axis of the conduit. As shown in FIG. 5, the Coanda-effect directional slit orifices consist of a passage which is roughly defined by the outside surface 31 of the conduit and the inside surface 32 of the side 26 of the orifice. Airflow through the orifices is generally as shown by arrows 33. It should be noted, as indicated by the arrows, that the Coanda-effect directional orifices of the present invention tend to cause the flow of air through the manifold to stay relatively close to the inside surface of the conduit as it enters the conduit. The Coanda-effect was named after Henry Coanda who in 1910 while testing a new flying machine observed the tendency of a fluid to cling to a surface that is near an orifice from which the fluid emerges. Note the curvature of arrows 33 which indicate the air emerging from the orifices follows a curve instead of a straight path. Coanda explained this curved path as not simply the result of surface tension but the fact that the passage of air over the curved surface created a vacuum at the surface. After some distance, the air flow builds up to a general flow as shown by the straight arrows 34. It is believed that the air flow pattern at the entrance to the conduit is somewhat as shown in FIG. 8 in which the parabolic line 35 represents the beginning of measurable air flow and the arrows indicate the direction and speed of air flow. The longer vector arrows 36 indicate that the speed at the orifices is greater than the speed of the air at the center of the conduit at least near the portals. The arrows 37 at the center of the conduit are shorter indicating a slower velocity. Note, the velocity pattern in the vicinity of the directional orifices is the reverse of the velocity pattern in the mid-section of the conduit where the flow pattern follows the normal pattern in which the air speed is slower at the sides of the conduit due to surface friction.

Each of the directional orifices includes a guiding member which in FIG. 5 is indicated by the bracket 38 which extends outwardly from the wall of the conduit to an abrupt end 39 thereby providing an unobstructed inner wall surface which is composed of smooth surface areas 41 between the slitted areas. As shown, the guiding members do not overlap the transverse slits in the conduit. It it to be noted that overlapping guiding members might be used and the application is not limited to non-overlapping guiding members. It is impractical, however, to economically construct overlapping guiding members at the present time.

The number, size, and placement of the Coanda-effect directional orifices for obtaining optimum results depends upon the object to be moved; their weight, size, shape and the speed at which they are to be moved. While it is possible to move objects and vehicles with a few orifices, for most commercial applications, it is necessary to provide sufficient orifices so that they substantially encircle the inside wall of the conduit to move the vehicle without air transmission through one of the portals.

In FIG. 2, a plurality of rows 50 of Coanda-effect directional slit orifices are indicated by the bracket 51. While there is no particular significance to placing the orifices in rows, usually for purposes of manufacture, it is convenient to use some system of uniformity.

There appears to be one critical limit as to the orifices and that is the fact that the total area of the directional orifices must be less than the cross sectional area of the conduit. The velocity through the orifices must be greater than the average velocity of the driving air in the conduit. Thus in order to prevent transfer of air through one of the portals, the area of the orifices must be less than the area of the conduit.

The system of the present invention is particularly adapted for moving vehicles or objects from one station to another where one of the stations is within an environment of treated air and the other station is not. For example, as shown in FIG. 1, building 52 may be an air conditioned building and the outside temperature may be very hot. It is desirable, therefore, to retain the cooled air within the building and to use outside hot air to move the vehicle. It is essential that little or no refrigerated air pass through inlet 3 and through the conduit 2 to the outside. At the same time, since hot air as indicated by number 53 enters the blower fan 13 is forced through manifold 12 as shown by arrow 54, moves through orifices 6 as shown by arrow 55 and thence through the conduit as shown by arrow 56, it is immaterial that this air is blown out outlet 4 to the atmosphere. It has been observed that there is a slight intake of air at opening 3 as vehicle 1 enters the inlet, but after passage through the manifold area, there is little or no air movement through the inlet.

As FIG. 4 indicates, the conduit may be square as indicated by the number 61, rectangular as indicated by the number 62, or circular as shown by the number 63.

FIGS. 9 and 10 illustrate one use of a circular conduit using the apparatus as described in this specification. As shown, the vehicle is a cylindrical bottle such as a plastic bottle 64. The entire system is similar to that described in FIG. 1 except that the manifold 66 is formed with a plurality of orifices 67 which surround the circular conduit 68. As a practical matter it is desirable to place skids 69 in the conduit and the manifold to prevent marring of the plastic bottle as it passes over the orifices.

FIG. 11 illustrates another application of a circular conduit conveyor system in which the article is a cylindrical container such as an empty or filled can 71. The can moves in conduit 72 in the direction of arrow 73; propelled by air as indicated by arrows 74. It is also possible with the present system to move cans with their axis transverse to the longitudinal axis of the conduit in a round or square conduit. Further, the cans can also be moved in an upright position in a square conduit.

FIG. 12 illustrates the use of the system of the present invention for moving objects such as plastic bottle caps 76 which are light enough to be airborn by the air currents 77 in the direction of arrow 78. The caps can be inserted into the conduit by machines or by gravity and are ejected through the exit portal by the inertia of their forward motion. If the orifices are at the inlet end, there is no problem of ejection since the caps will continue through the exit portal with the driving air. It is important that the objects 76 be greater in dimension than the orifice openings so that the objects will not be drawn through the orifices and through the blower unit.

TEST NO. 1 FOR WHEELED VEHICLES

The 100 ft. conduit and the portal openings measure 13 in. × 13 in. with the section carrying the directional orifices measuring 24 in. in length. Directional orifices were placed on all four sides of the conduit adjacent the portal as shown in the drawings. A manifold extending out an additional 4 inches on all four sides and a length of 2 feet surrounded the directional orifices. The directional orifices are 0.085 inches in depth as indicated by arrows 9 and have a width of 0.25 inches as indicated by arrows 79, an axial spacing of slots of ⅜ inch as indicated by arrows 83, axial orifices length of 7/16 in. as indicated by arrows 81, a transverse row spacing of ⅜ in. center to center as indicated by arrows 84 and a transverse slit length of 1 in. as indicated by arrow 82.

A 5 horsepower fan was connected to the manifold which was formed with 2250 directional orifices. The carrier rear panel had an area of about 144 sq. in. The tests were made with a load in which the total weight of the vehicle and load was 50 lbs.

| Run No. 1 | | |
|---|---|---|
| | Velocity of air in the conduit | 2030 ft./min. |
| | Velocity of vehicle | 460 ft./min. |
| Run No. 2 | | |
| | Velocity of air in the conduit | 1950 ft./min. |
| | Velocity of vehicle | 400 ft./min. |
| Run No. 3 | | |
| | Velocity of air in the conduit | 1790 ft./min. |
| | Velocity of vehicle | 324 ft./min. |

Tests on slot velocity indicate that for the classic 0.060 inch depth orifice, the velocity of the air through the orifices is three to four times the resulting velocity of air in the conduit. When the depth of orifice was increased to 0.085 inches, the velocity of air through the orifices was reduced to 2 to 2½ times the resulting velocity in the conduit.

TEST NO. 2 CIRCULAR CONDUIT FOR BOTTLES

Tests were conducted with a conduit of circular cross section of 6 inches in diameter for moving plastic bottles 3¼ in. diameter by 11 in. long weighing 2½ ounces. The system used the classic slot depth of 0.060 inches with a row spacing of 1 inch center to center. Three hundred directional orifices producted manometer reading of 0.4 inches of water and an air velocity of 2500 ft./min. in the tube. Bottle speeds with the bottles empty were about 80 percent of the conduit air speed.

TEST NO. 3 CIRCULAR CONDUIT FOR CANS

Same as above but conveyed empty metal cans 4¼ ins. in diameter by 5 in. long weighing 4 ounces.

TEST NO. 4 CIRCULAR CONDUIT BOTTLE CAPS

Tests were conducted with a 100 ft. long conduit of circular cross section of 5 inches in diameter for moving plastic bottle caps approximately ½ to 1½ in. diameter and weighing about 1 ounce. The system used the classic slot depth of 0.060 inches. Two-hundred orifices produced a manometer reading of 0.3 inches of water, an air velocity of 2200 ft./min. in the tube. Bottle cap speeds averaged about 80 percent of the conduit air speed.

I claim:

1. An air propelled transportation system for transporting objects by air currents comprising:
   a. an elongated conduit having a substantial length devoid of openings for containing moving air at low gauge pressure having unrestricted entrance and exit non-gated portals open at all times to atmospheric pressure at the ends of said conduit during operation of said system;
   b. a plurality of axially aligned closely spaced Coanda-effect directional slit orifices around the greater part of the inside wall of said conduit in close spaced side-by-side relation and each orifice having an opening which is substantially greater in width than depth formed in the walls of said conduit and located adjacent said entrance portal;
   c. said orifices having an area dimensioned to prevent passage of said objects therethrough;
   d. an air manifold communicating with said plurality of directional orifices;
   e. powered fan or blower means communicating with said air manifold for supplying a quantity of air to said manifold so that the pressure in said conduit is slightly above or below the pressure outside said portals; and
   f. said conduit, Coanda-effect directional slit orifices, manifold, and power means being dimensioned and regulated to drive said objects through said conduit and to supply substantially all of said air moving through said conduit through said manifold and with a minimal amount of air entering or leaving said portal adjacent said manifold and orifices when no objects are traveling through said conduit and a minimal amount of air flows in or out of said portal adjacent said orifices when said objects are in transit through said conduit.

2. A system as described in claim 1 comprising:
   a. the total area of said plurality of directional orifices is less than the cross sectional area of said conduit.

3. A system as described in claim 1 comprising:
   a. each of said directional orifices consists of a passage formed in said conduit at an acute angle having a slope no greater than about 15° to the axis of said conduit.

4. An air propelled vehicle transportation system comprising:
   a. an elongated vehicle conduit having a substantial length devoid of openings and having a substantially uniform cross section for containing moving air at low gauge pressure having unrestricted entrance and exit non-gated portals open at all times to atmospheric pressure at the ends of said conduit during operation of said system;
   b. a vehicle dimensioned for travel through said conduit and said portals; and having a cross sectional area slightly less than the area of said conduit and portals;
   c. a plurality of axially aligned closely spaced Coanda-effect directional slit orifices around the greater part of the inside wall of said conduit and each orifice having an opening which is substantially greater in width than depth formed in the walls of said conduit and located adjacent said entrance portal;
   d. an air manifold communicating with said plurality of directional orifices;
   e. powered fan or blower means communicating with said air manifold for supplying a quantity of air to said manifold so that the pressure in said conduit is slightly above or below the pressure outside said portals; and
   f. said conduit, Coanda-effect directional slit orifices, manifold, and power means being dimensioned and regulated to drive said vehicle through said conduit and to supply substantially all of said air through said manifold and with a minimal amount of air entering or leaving said portal adjacent said manifold and orifices when no vehicle is traveling through said conduit and a minimal amount of air flows in or out of said portal adjacent said orifices when said vehicle is in transit through said conduit.

5. A system as described in claim 4 comprising:
   a. the total area of said plurality of directional orifices is less than the cross sectional area of said conduit.

6. A system as described in claim 4 comprising:
a. said conduit is formed with a circular cross section; and
b. said vehicle is a container.

7. A system as described in claim 4 comprising:
a. said vehicle includes wheels for supporting the weight of said vehicle; and
b. said wheels are mounted for engaging contact with the side walls of said conduit and for spacing the main body of said vehicle from the sidewalls of said conduit.

8. An air propelled vehicle transportation system comprising:
a. an elongated vehicle conduit having a substantial length devoid of openings and having a substantially uniform cross section for containing moving air at low gauge pressure having unrestricted first and second non-gated portals open at all times to atmospheric pressure at the ends of said conduit;
b. a vehicle dimensioned for travel through said conduit and said portals; and having a cross sectional area slightly less than the area of said conduit and portals;
c. a plurality of axially aligned closely spaced Coanda-effect directional slit orifices spaced around the greater part of the inside wall of said conduit in close spaced side-by-side relation and each orifice having an opening which is substantially greater in width than depth formed in the walls of said conduit and located adjacent said entrance portal so that the air flow is initially along the surface of said conduit and provides driving air in a direction toward said second portal;
d. an air input manifold communicating with said plurality of directional orifices;
e. powered fan or blower means communicating with said manifold for supplying a quantity of air to said manifold so that the pressure in said conduit is slightly above the pressure outside said portals;
f. said conduit, Coanda-effect directional slit orifices, manifold and power means being dimensioned and regulated to drive said vehicle through said conduit and to supply substantially all of the air through said manifold so that all air is transferred through said exit portal with a minimal amount of air entering at said entrance port when no vehicle is traveling through said conduit and a minimal amount of air flows out of said port when said vehicle is in transit through said conduit;
g. there being a substantial number of orifices in said first plurality of orifices forming a row; and
h. there being a plurality of closely spaced rows of orifices and said rows are spaced along the longitudinal axis of said conduit for only a minor portion of the total length of said conduit.

* * * * *

UNITED STATES PATENT AND TRADEMARK OFFICE
CERTIFICATE OF CORRECTION

PATENT NO. : 4,078,498
DATED : March 14, 1978
INVENTOR(S) : Rudolph E. Futer

It is certified that error appears in the above-identified patent and that said Letters Patent are hereby corrected as shown below:

Column 1, line 22, change "exits" to --- exists ---

Column 2, line 23, change "circuit" to --- conduit ---

Column 2, line 31, change "width 8" to --- width 79 ---

Column 5, line 32, change "producted" to --- produced ---

Signed and Sealed this

First Day of August 1978

[SEAL]

Attest:

RUTH C. MASON
Attesting Officer

DONALD W. BANNER
Commissioner of Patents and Trademarks